Figure 1:
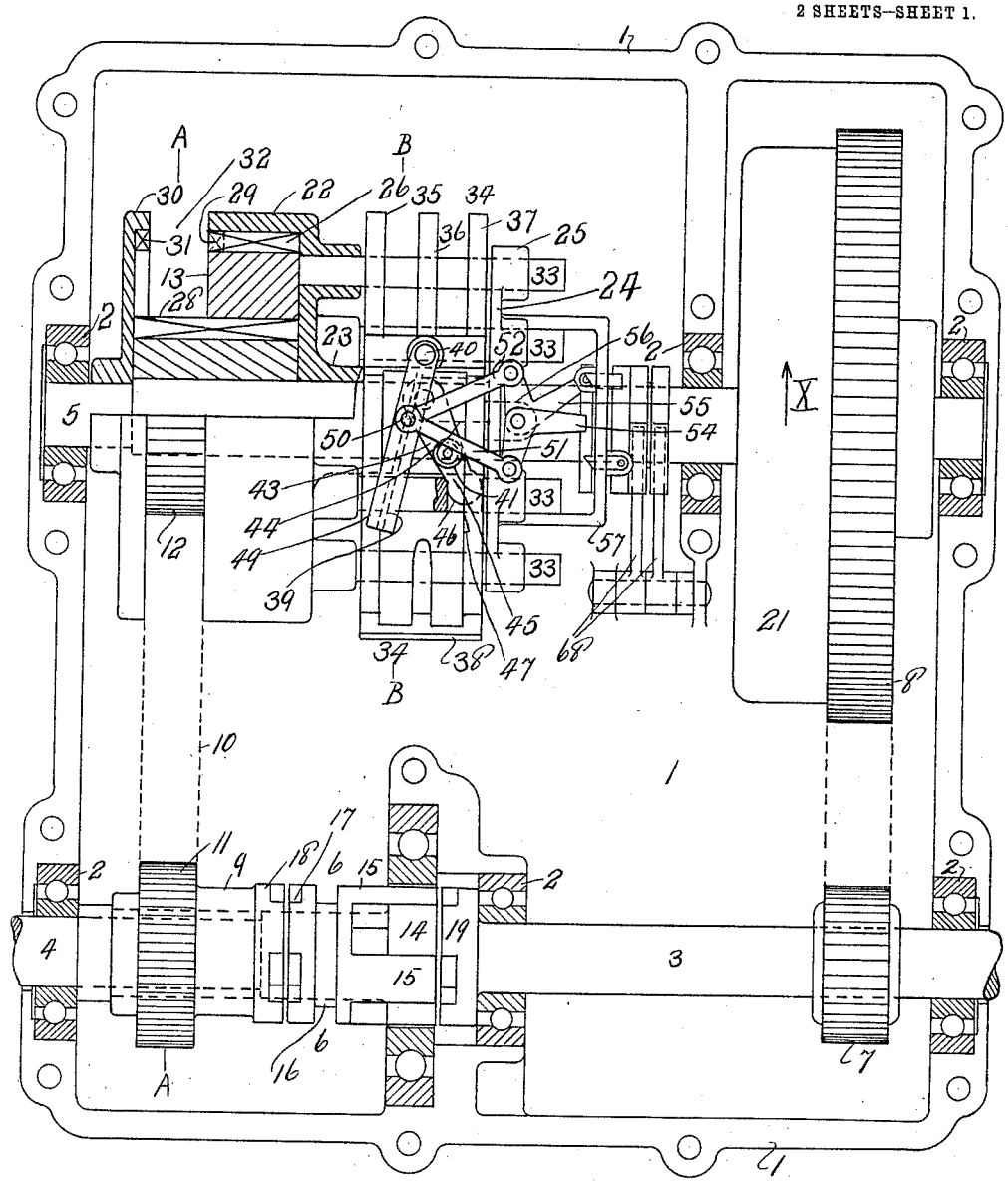

G. P. KENT & A. R. MITCHELL.
VARIABLE SPEED GEARING.
APPLICATION FILED SEPT. 29, 1911.
1,044,535.
Patented Nov. 19, 1912.
2 SHEETS—SHEET 2.
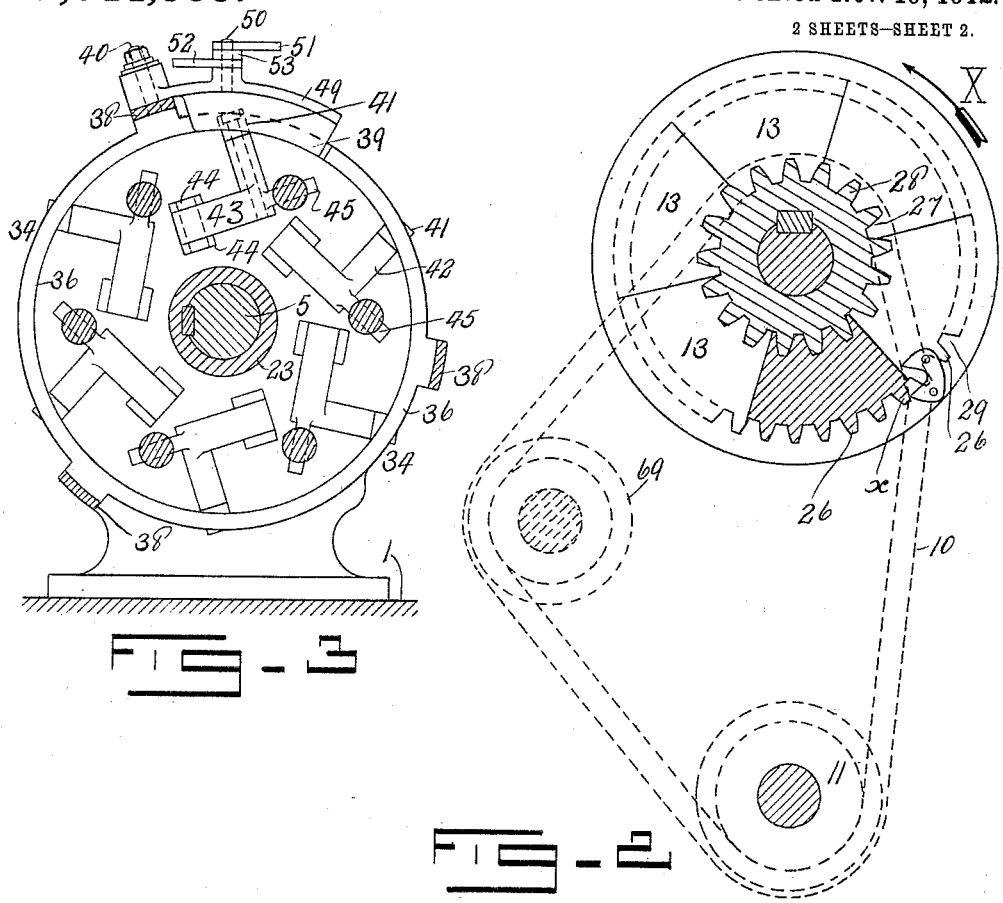
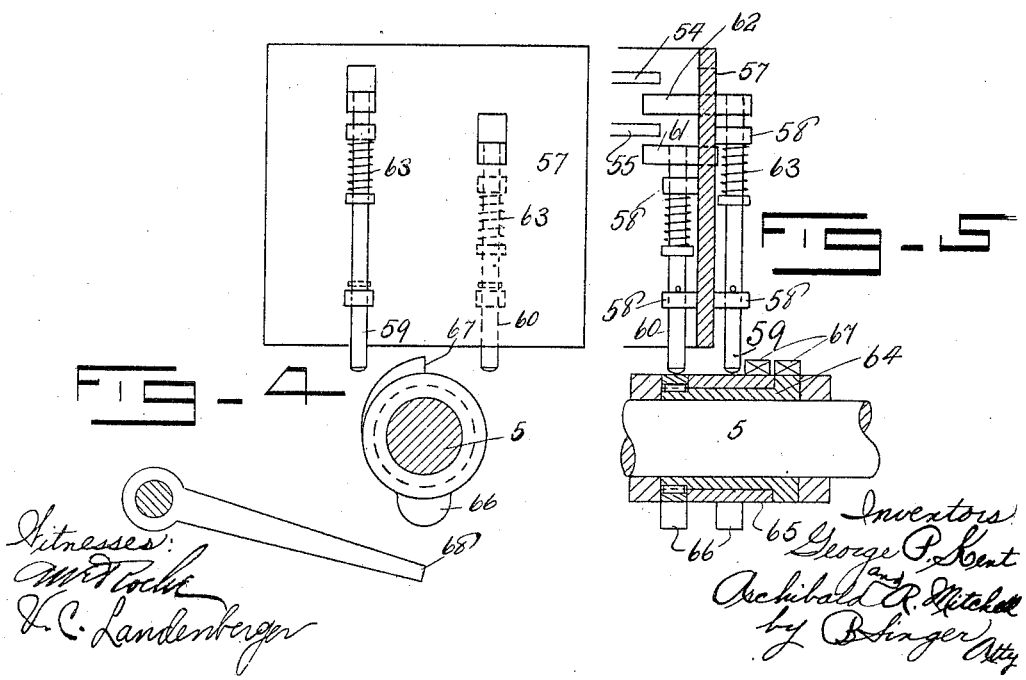

UNITED STATES PATENT OFFICE.

GEORGE PERCY KENT AND ARCHIBALD ROBERTSON MITCHELL, OF LONDON, ENGLAND.

VARIABLE-SPEED GEARING.

1,044,535.  Specification of Letters Patent.  Patented Nov. 19, 1912.

Application filed September 29, 1911. Serial No. 651,990.

*To all whom it may concern:*

Be it known that we, GEORGE PERCY KENT and ARCHIBALD ROBERTSON MITCHELL, both of London, England, have invented certain new and useful Improvements in Variable-Speed Gearing, of which the following is a specification.

This invention relates to a new or improved variable speed gearing of the type where chains are employed in conjunction with wheels or pulleys of variable diameter, and wherein the velocity ratio is varied by shifting the driving chain from the smaller chain wheel on to a larger one (the chain always remaining in the same plane) by successively introducing sections of the larger chain wheel into the plane of the chain between the points where the chain approaches and leaves the smaller chain wheel and successively withdrawing said sections between the aforesaid points to replace the chain upon the smaller chain wheel.

Our invention consists of a complete change speed gearing suitable for motor vehicles involving the above conditions and having a gear wheel composed of toothed segments housed within a casing when not in the operative position but supported on either side when engaging the driving chain.

A feature of great importance consists in an arrangement of the toothed segments so that a particular one of them is designed to pick up the chain and means are provided for insuring that under all conditions this leading segment will first engage the chain and the other segments will follow.

Another feature of importance consists in throwing the segments in and out of the plane of the chain mechanically, the mechanism being accurately timed to perform the function during the successive intervals that the segments are between the points where the chain approaches and leaves the smaller chain wheel. Unless the speed of the chain be exceedingly low (lower than in standard practice) the method of performing this function, by hand, will be found to be totally inadequate.

Further features of our invention comprise the general arrangement and construction and the means for operating to change the gear.

In order that our invention may be more readily understood and carried into practice, reference is hereby made to the accompanying drawings throughout which like numerals of reference indicate corresponding parts wherever occurring and wherein:

Figure 1 is a plan view of a gearing constructed in accordance with our invention with half the gear case removed and parts shown in section where necessary for clearness and convenience of illustration. Fig. 2 is a section on line A—A looking from left to right of Fig. 1 with all parts unnecessary for effecting the object of the view omitted. Fig. 3 is a similar section on line B—B, while Figs. 4 and 5 illustrate in detail a portion of the mechanism necessary to effect the change of gear.

In these drawings 1 represents the lower half of the crank case which among other things forms the beds for ball bearings 2 which support shafts 3, 4 and countershaft 5. Shaft 3 is driven by the engine or from any source of power and can be coupled to the shaft 4 by the dog clutch 6. This shaft 3 drives the shaft 5 by means of a "Reynolds" silent or other form of chain gearing with the sprocket 7 on shaft 1 and the chain wheel 8 on shaft 5. Motion is communicated from the shaft 5 to the bushed sleeve 9, which is loose on the shaft 4, by means of a chain 10 which gears with the sprocket 11 on the sleeve 9 and with either of the chain wheels 12 or 13 on shaft 5 as will hereafter appear. A direct drive is obtained by coupling together the shafts 3 and 4, by means of the dog clutch 6 mentioned above and the indirect drives by driving shaft 4 from shaft 5 by clutching the sleeve fast to the shaft 4 also by means of the dog clutch 6 as will hereafter be made clear.

Upon one end of shaft 4 is a flange 14 which is slotted or grooved to receive the dogs 15 formed integral with the sleeve 16 forming the sliding portion of the dog clutch 6. In this manner the sliding portion or sleeve 16 is secured against rotary motion relatively to the shaft upon which it is mounted. Upon the end of the sleeve 16 remote from the dogs 15 are dogs 17. These engage dogs 18 on the sleeve 9 while the dogs 15 engage dogs 19 on the enlarged end of shaft 13. The flanges in which the dogs 15 and 17 are cut provide a groove to receive the blades of a fork. When dogs 15 are meshed with dogs 19 the drive is transmitted directly to shaft 4 and sleeve 9 runs idly, but when dogs 15 are withdrawn from dogs 19 and dogs 17 meshed with dogs 18 the drive is transmitted to shaft 4 by the sleeve 9 through the counter-shaft 5. Three speeds are obtainable from the gearing shown.

The sprocket 12 is secured fast upon the counter-shaft 5 and extends beyond the chain 10 into the shell 22. The shell 22 is also fast upon the counter-shaft 5 and is provided with a neck 23 at the extremity of which is a flange 24 provided with bosses 25. The chain wheel 13 is composed of a plurality of segments (Fig. 2) six being shown in the present case. These segments are provided on their outer curved faces with teeth 26. Their inner curved faces are slotted to form teeth 27 which fill the spaces between the teeth 28 of the pinion. The teeth 26 also nest between internal teeth 29 in the shell 22. Abutting against the left hand end of the sprocket 13 is a plate 30. This plate is fast upon the counter-shaft 5 and is provided with internal teeth 31 exactly opposite the teeth 29. When the segments of the chain wheel 13 are pushed into the space 32 in the manner hereafter described the ends of the teeth 26 will lie between the teeth 29 and 31 which together with the teeth 27 and 28 will hold the segment firmly in position. Each of the aforesaid six segments of the chain wheel 13 is provided with a pin 33. The pins 33 pass through the wall of the shell 22 and are supported at their outer ends in the bosses 25 upon the flange 24 provided integral with the neck 23 of the shell 22 as hereinbefore described.

Between the shell 22 and the flange 24 is a tramway 34 (Figs. 1 and 3). This tramway is bolted down to the case 1 or otherwise held stationary. It consists mainly of three circular rails 35, 36 and 37 connected by bridges 38 so as to leave uninterrupted paths between the rails. The outside rails 35 and 37 are continuous. The middle rail 36 is, however, not continuous and the space between its ends permits of the necessary movements of the swinging rail 39. This rail is pivoted to one of the bridges 38 as shown at 40 and consists of a T rail with the undivided web depending between the circular rails.

Between the rails 35 and 36, and 36 and 37 run rollers 41. These rollers are pivoted upon pillars 42 (Fig. 3) on levers 43 which are pivoted upon brackets 44 (Fig. 1) projecting from the left hand flat face of the flange 24. The levers 43 are extended beyond the pillars 42 to form members 45 which are accommodated in slots 46 in the pins 33. The rollers 41 are shown running between the rails 36 and 37. If now the swinging rail 39 be swung to the right until its end enters the notch 47 and the shaft 5 with its connections be rotating in the direction indicated by arrows X the rollers 41 will be thrown over into the path between rails 35 and 36. This movement will cause an angular movement of the levers 43 and consequently the members 45, which exert forces on the walls of the slots 46 in the pins 33 and thus force the pins 33 and consequently the segments 13 successively into the space 32 until the teeth 26 thereon engage the teeth 31 in the plate 30. The segments 13 are so timed as described above, that they perform the foregoing movement in the interval during which they lie between the points where the chain 10 engages and disengages the chain wheels. If the swinging rail 39 be returned to the position shown, the rollers 41 will be thrown back into the path between the rails 36 and 37 as shown in the drawings and the segments 13 thereby again drawn into the shell 22 which is their position in Fig. 1 of the drawings. This motion of the segments 13 must also be performed in the interval during which they occupy positions between the points where the chain engages and disengages the chain wheel. In Fig. 2 the shaded section 13 is considered as occupying the space 32 and is shown in the act of meshing with the chain 10.

Upon the member 49 of the T rail 39 is a post 50 upon which are pivoted links 51, 52 which are spaced by the washer 53. These links couple the rail 39 to the bell cranks 54, 55, which are pivoted to a bracket 56 projecting from the rail 37. The flange 24 carries a U-shaped member 57 which rotates therewith. Upon the U-shaped member 57 are lugs 58 in which are mounted rods 59, 60 which carry heads 61, 62. The rods 59, 60 are normally held in the position shown by means of springs 63 so that the heads 61 and 62 pass clear of the bell cranks 54, 55. Upon the counter-shaft are concentric sleeves 64, 65. Upon these sleeves are humps 66 and stops 67. The lower ends of the rods 59 and 60 lie in the paths of the humps 66 and are adapted to be lifted thereby as the member 57 revolves around the axis of the counter-shaft 5. Being loosely mounted they are unable to lift the rods 59 and 60 in opposition to the forces exerted by the springs 63 and therefore when they strike the humps the sleeves 64 and 65 rotate with them. When however either of the stops 68 is brought into the path of the corresponding stops 67 the sleeve 64 or 65 is arrested and its rod 59, 60 lifted as it is carried around so that one of the heads 61, 62 lies in the path of its associated one of bell cranks 55, 54 which it strikes rotating it and swinging the swinging rail 39 from one extreme position to the other. A jockey pulley 69 is preferably provided to take up the slackness of the chain.

In setting out the teeth on the chain wheel 12 and the sections 32 it is necessary to settle upon one of the segments as the "leader." This segment will be first to be thrust into the plane of the chain. The position of this segment is fixed so that the first tooth $x$ thereon correctly meshes with and picks up the chain. The angle between the approaching side of the chain and the imaginary line joining the centers of the shafts 3 and 5 must be determined before the position of the first tooth can be fixed. The mechanical arrangement shown for sliding the sections 13 does, in fact, thrust them into the path of the chain in a definite sequence with a fixed leader; therefore it is only necessary to time the mechanism, say by positions of the humps 66, that the section carrying the tooth $x$ is the leader. In some cases, particularly where a belt drive is required, it may be better in place of the toothed segments aforesaid, to provide driving pulleys of stepped cone form and divide this cone pulley into a number of longitudinal parts. The change of diameter will then be effected by axially moving the parts of the stepped cone successively so as to bring the different steps into engagement with the chain, the arrangement here again being such that during a revolution, the pulley will be coupled in completing the substitution of one step for another. It will be seen that although a gear on the lines of the foregoing will not be infinitely variable, considerable steps can be provided for.

What we claim and desire to secure by Letters Patent is:

1. In change speed gearing driving and driven members each having a plurality of chain or belt paths made up of sections or segments, and means operable at will for successively moving the sections or segments from ineffective positions into effective positions whereby a complete change of diameter is effected in one revolution of the member.

2. In change speed gearing the combination with a change speed wheel made up of sections designed to be thrust into the plane of the chain and forming a complete working wheel, of mechanical timing means operating to thrust the sections successively into the plane of the chain in a definite sequence following a particular leading section and hand operated means for controlling the operation of the mechanical timing means substantially as specified.

3. A change speed transmission mechanism comprising wheels and a transmission belt trained about said wheels, a change speed transmission wheel comprising a plurality of segments disposed adjacent one of said first named wheels, and mechanism for successively shifting said segments into the plane of the belt between the points of lap engagement of the belt with such last named wheel whereby an enlarged working wheel is formed within said belt, substantially as described.

4. The combination with a pair of wheels and a belt trained thereabout, of a change speed wheel composed of a plurality of sections, and mechanism for moving said sections beneath the belt to shift the same from one of said first named wheels to said change speed wheel, substantially as described.

5. The combination with a pair of wheels and a belt trained thereabout, of a change speed wheel composed of a plurality of sections, and mechanism for successively moving said sections under the belt to shift the same from one of the first named wheels to said change speed wheel, substantially as described.

6. The combination with a pair of wheels and a belt trained thereabout, of a change speed wheel composed of a plurality of sections, and mechanism for moving said sections beneath the belt between the points of lap engagement thereof with one of said first named wheels to shift said belt from such first named wheel to said change speed wheel, substantially as described.

7. The combination with a pair of wheels and a belt trained thereabout, of a change speed wheel composed of a plurality of sections, and mechanism for moving said sections beneath the belt and about and in concentric relation with one of said first named wheels to shift the belt from such first named wheel to said change speed wheel, substantially as described.

8. The combination with a pair of wheels and a belt trained thereabout, of a change speed wheel composed of a plurality of sections slidably connected to one of said first named wheels, and mechanism for sliding said sections beneath the belt to shift the same from such first named wheel to said change speed wheel.

9. The combination with a pair of wheels and a belt trained thereabout, of a change speed wheel composed of a plurality of sections keyed on the periphery of one of said first named wheels axially with respect to such wheel, and mechanism for moving said sections beneath the belt to shift the same from such first named wheel to said change speed wheel, substantially as described.

10. The combination with a pair of wheels and a belt trained thereabout, of a change speed wheel composed of a plurality of sections disposed at one side of the plane of the belt, and mechanism for moving said sections into the plane of the belt and beneath the same to shift the belt from one of said first named wheels to said change speed wheel, substantially as described.

11. The combination with a pair of wheels and a belt trained thereabout, of a change speed wheel composed of a plurality of sections disposed in concentric relation with respect to one of said first named wheels, and mechanism for moving said sections beneath the belt and into concentric relation with said first named wheel and about the same to shift the belt from such first named wheel to said change speed wheel, substantially as described.

12. The combination with a pair of wheels and a belt trained thereabout, of devices disposed on opposite sides of said first named wheel and fixed to rotate therewith, a change speed wheel composed of a plurality of sections fixed to rotate with one of said devices, and mechanism for shifting said sections beneath the belt and into keyed relation with other of said devices to shift the belt from said first named wheel to said change speed wheel, substantially as described.

13. The combination with a pair of wheels and a belt trained thereabout, of a change speed wheel composed of a plurality of sections keyed to the periphery of one of said first named wheels and disposed laterally of the plane of the belt, and means for shifting said sections axially on the periphery of said first named wheel and under the belt to shift the same from such first named wheel to said change speed wheel, substantially as described.

14. The combination with a pair of wheels and a belt trained thereabout, of devices disposed on opposite sides of one of said first named wheels and fixed to rotate therewith, a change speed wheel composed of a plurality of sections keyed to the periphery of one of said first named wheels and also keyed to rotate with one of said devices, and mechanism for shifting said sections beneath the belt and into keyed relation with the other of said devices to lift the belt from such first named wheel to said change speed wheel, substantially as described.

15. The combination with a pair of wheels and a belt trained thereabout, of a change speed wheel composed of a plurality of sections provided with shifting pins or rods, pivoted devices connected with said rods, and mechanism for shifting said devices to move said sections beneath the belt to shift the same from one of such first named wheels to said change speed wheel, substantially as described.

16. The combination with a pair of wheels and a belt trained thereabout, of a change speed wheel composed of a plurality of sections provided with shifting pins or rods, pivoted devices connected with said rods, mechanism for engaging said devices to maintain said mechanism in one of two shifted positions, and a switch device for switching said pivoted devices to move said sections into or out of the plane of the belt, substantially as described.

In testimony whereof we affix our signatures in presence of two witnesses.

GEORGE PERCY KENT.
ARCHIBALD ROBERTSON MITCHELL.

Witnesses:
A. A. THORNTON,
VINCENT HUGHES.

---

Copies of this patent may be obtained for five cents each, by addressing the "Commissioner of Patents, Washington, D. C."